(12) United States Patent
Xu et al.

(10) Patent No.: US 8,558,969 B2
(45) Date of Patent: Oct. 15, 2013

(54) PRISM SHEET WITH CURVED SURFACE AND LIQUID CRYSTAL DISPLAY DEVICE USING SAME

(75) Inventors: Yi Xu, Shenzhen (CN); Ching-Huang Lin, Miao-Li (TW)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 1072 days.

(21) Appl. No.: 12/221,631

(22) Filed: Aug. 4, 2008

(65) Prior Publication Data
US 2009/0033831 A1    Feb. 5, 2009

(30) Foreign Application Priority Data

Aug. 3, 2007   (CN) .......................... 2007 2 0122049

(51) Int. Cl.
G02F 1/1333    (2006.01)
G02F 1/1335    (2006.01)
G02B 5/04      (2006.01)
G02B 7/18      (2006.01)
F21V 7/04      (2006.01)

(52) U.S. Cl.
USPC ................... 349/64; 349/57; 349/62; 349/63; 349/65; 362/608; 362/620; 362/626; 359/831

(58) Field of Classification Search
USPC ......... 349/57, 62–65; 359/831; 362/608, 620, 362/626
See application file for complete search history.

(56) References Cited

U.S. PATENT DOCUMENTS

| 7,251,079 B2 | 7/2007 | Capaldo et al. | |
| 2004/0051825 A1* | 3/2004 | Lee et al. | 349/65 |
| 2006/0256582 A1* | 11/2006 | Chuang | 362/620 |
| 2006/0279296 A1* | 12/2006 | Lee et al. | 324/691 |
| 2007/0275215 A1* | 11/2007 | Lu | 428/172 |

* cited by examiner

Primary Examiner — Mark Robinson
Assistant Examiner — Jerry Blevins
(74) Attorney, Agent, or Firm — WPAT, PC; Justin King

(57) ABSTRACT

An exemplary prism sheet includes a base including an upper surface and a plurality of lenses disposed on the upper surface. The upper surface is a wavy surface. A liquid crystal display device using the prism sheet is also provided.

13 Claims, 2 Drawing Sheets

PRISM SHEET WITH CURVED SURFACE AND LIQUID CRYSTAL DISPLAY DEVICE USING SAME

CROSS-REFERENCE TO RELATED APPLICATION

This application is related to, and claims the benefit of, a foreign priority application filed in China as Serial No. 200720122049.X on Aug. 3, 2007. The related application is incorporated herein by reference.

FIELD OF THE INVENTION

The present invention relates to a prism sheet that has a curved surface and a liquid crystal display (LCD) device implementing the prism sheet.

BACKGROUND

LCD devices are commonly used as displays for compact electronic apparatuses, because they provide good quality images with little power consumption and are very thin. The liquid crystal material in an LCD device does not emit light. The liquid crystal material must be lit by a light source to clearly and sharply display text and images. Thus, a backlight module is generally needed for an LCD device.

Referring to FIG. 4, a typical LCD device 1 includes a display panel 10 and a backlight module 19 opposite to the display panel 10. The display panel 10 includes a first substrate 11, a second substrate 12 parallel to the first substrate 11, and a liquid crystal layer 13 sandwiched between the first and second substrates 11, 12. A color filter layer 14 is formed on a surface of the first substrate 11 adjacent to the liquid crystal layer 13. Red (R), green (G), and blue (B) filter elements are arranged equidistantly in the color filter layer 13 and separated by a black matrix 15.

The backlight module 19 includes a light source 191, a reflector 192, a light guide plate (LGP) 193, a first diffuser 194, a prism sheet 195, and a second diffuser 196. The reflector 192, the LGP 193, the first diffuser 194, the prism sheet 195, and the second diffuser 196 are positioned in that order, with the second diffuser 196 positioned adjacent to the display panel 10. The light source 191 is positioned adjacent to the LGP 193.

The LGP 193 is used to convert linear light beams emitted by the light source 191 into planar light beams. The first and second diffuser 194, 196 are used to homogenize the planar light beams converted by the LGP 193. The prism sheet 195 is used to convert scattered planar light beams into concentrated planar light beams for promoting a brightness of the planar light beams. The prism sheet 195 includes a base 198 and a plurality of lenses 197. The lenses 197 have the same shape and form a serrated surface on a surface of the base 198 facing the display panel 10.

However, an optical grating is liable to be formed because the lenses 197 are similarly shaped and a distance between each two adjacent lenses 197 is the same. In addition, another optical grating is liable to be formed from the black matrix 15. As a result, Morie fringes are generated as light beams pass through the two optical gratings, thereby deteriorating the display characteristics of the LCD device 1.

Therefore, an improved prism sheet is desired to overcome the above-described deficiencies.

SUMMARY

An aspect of the invention relates to a prism sheet including a base including an upper surface and a plurality of lenses disposed on the upper surface. The upper surface is a wavy surface.

Other novel features and advantages will become more apparent from the following detailed description and when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION OF PREFERRED EMBODIMENTS

Reference will now be made to the drawings to describe the embodiments in detail.

Figure 1:
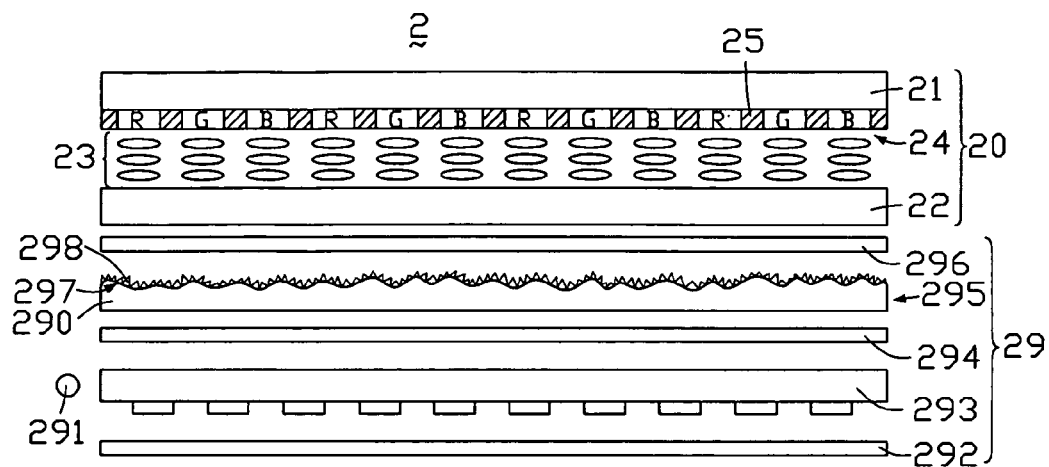
FIG. 1 is an exploded, side view of a first embodiment of an LCD device, the LCD device including a prism sheet.

Referring to FIG. 1, a first embodiment of an LCD device 2 includes a display panel 20 and a backlight module 29 opposite to the display panel 20. The display panel 20 includes a first substrate 21, a second substrate 22 parallel to the first substrate 21, and a liquid crystal layer 23 sandwiched between the first and second substrates 21, 22. A color filter layer 24 is formed on a surface of the first substrate 21 adjacent to the liquid crystal layer 23. Red (R), green (G), and blue (B) filter elements are arranged in the color filter layer 24, and separated by a black matrix 25.

The backlight module 29 includes a light source 291, a reflector 292, an LGP 293, a first diffuser 294, a prism sheet 295, and a second diffuser 296. The reflector 292, the LGP 293, the first diffuser 294, the prism sheet 295, and the second diffuser 296 are positioned in that order, with the second diffuser 296 positioned adjacent to the display panel 20. The light source 291 is positioned adjacent to the LGP 293.

The LGP 293 is used to convert linear light beams emitted by the light source 291 into planar light beams via light guide spots (not labeled) disposed thereon. The first diffuser 294 is used to homogenize light spots formed from the light guide spots of the LGP 293. The prism sheet 295 is used to convert scattered planar light beams into concentrated planar light beams. The second diffuser 296 is used to homogenize the planar light beams passing through the prism sheet 295 and protect the prism sheet 295.

Figure 2:
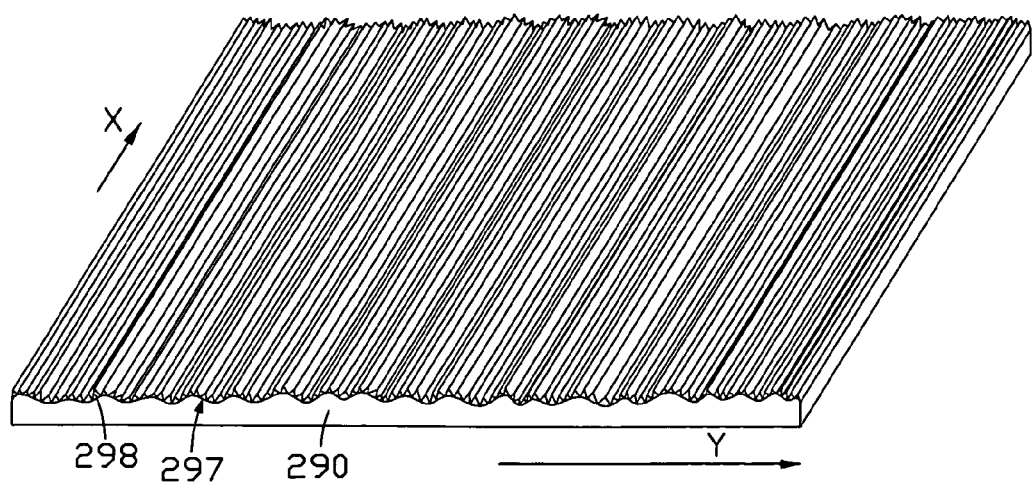
FIG. 2 is an isometric view of the prism sheet of FIG. 1.

Referring also to FIG. 2, the prism sheet 295 includes a base 290 and a plurality of lenses 298. The base 290 includes an upper surface 297. The plurality of lenses 298 are positioned on the upper surface 297. The upper surface 297 is a wavy surface along a Y direction and extends out in an X direction. The X direction is perpendicular to the Y direction. Each lens 298 has a same shape. In the first embodiment, each lens 298 is a long straight column having a triangular cross-section and is parallel to each other. The lenses 298 form a serrated surface along the Y direction and extend out in the X direction.

A distance between the centers of each pair of adjacent lenses 298 is different because the upper surface 297 is wavy along the Y direction. The wavy surface of the lenses 298 and the black matrix 25 destroys a forming condition of the Morie fringes, thereby improving the display characteristics of the LCD device 2.

Figure 3:
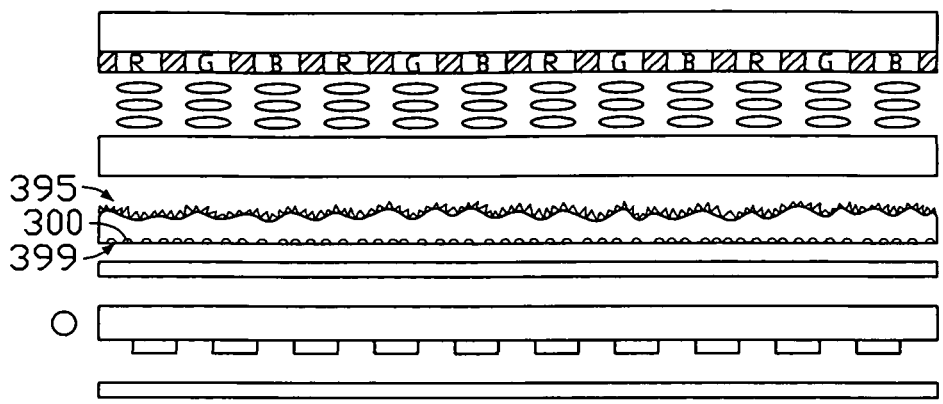
FIG. 3 is an exploded, side view of a second embodiment of an LCD device.
Figure 4:
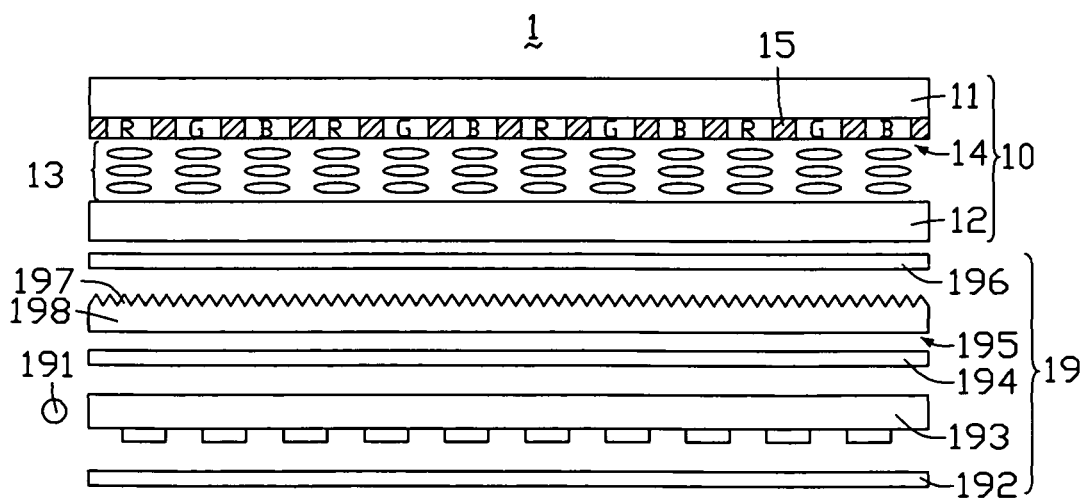
FIG. 4 is an exploded, side view of a typical LCD device.

Referring to FIG. 3, a second embodiment of an LCD device 3 is similar to the LCD device 2 of FIG. 1 except that a plurality of micro cavities 300 are defined in a lower surface 399 of a base 300 of a prism sheet 395. The micro cavities 300 are uniformly distributed, and used to diffuse light beams. Thus, the LCD device 3 can omit the second diffuser 296 of the LCD device 2 of FIG. 1.

It is to be understood that even though numerous characteristics and advantages of the present embodiments have been set forth in the foregoing description with details of the structures and functions of the embodiments, the disclosure is illustrative only, and changes made in detail, especially in matters of shape, size, and arrangement of parts, within the principles of the embodiments, to the full extent indicated by the broad general meaning of the terms in which the appended claims are expressed.

What is claimed is:

1. A prism sheet, comprising:
   a base comprising an upper surface; and
   a plurality of lenses disposed on the upper surface;
   wherein in a cross-section of the prism sheet, the upper surface is a continuous curve having a plurality of wave crests in different sizes and a plurality of wave troughs in different sizes;
   wherein the upper surface is wavy along a first direction and extends out linearly in a second direction, the first direction being perpendicular to the second direction;
   wherein the plurality of lenses form a serrated surface along the first direction and extend out linearly in the second direction, and each of the plurality of lenses is a long straight column having a triangular cross-section being parallel to each other.

2. The prism sheet of claim 1, wherein a distance defined between the centers of each pair of adjacent lenses is different.

3. The prism sheet of claim 1, wherein the lenses are arranged according to the upper surface to form a corresponding wave surface along the first direction.

4. A liquid crystal display device, comprising:
   a display panel; and
   a backlight module opposite to the display panel, the backlight module comprising:
      a prism sheet comprising a base and a plurality of lenses, the base comprising an upper surface, and the plurality of lenses are positioned on the upper surface;
   wherein in a cross-section of the prism sheet, the upper surface is a continuous curve having a plurality of wave crests in different sizes and a plurality of wave troughs in different sizes, the upper surface is wavy along a first direction and extends out linearly in a second direction, the first direction being perpendicular to the second direction;
   wherein the plurality of lenses form a serrated surface along the first direction and extend out linearly in the second direction, and each of the plurality of lenses is a long straight column having a triangular cross-section being parallel to each other.

5. The liquid crystal display device of claim 4, wherein the waviness along the first direction corresponding to the successive curve having the plurality of wave crests in different sizes and the plurality of wave troughs in different sizes.

6. The liquid crystal display device of claim 5, wherein the plurality of lenses are arranged according to the upper surface such that top edges of the lenses cooperatively define a wave surface along the first direction, the wave surface corresponding to the waviness of the upper surface along the first direction.

7. The liquid crystal display device of claim 6, wherein a distance defined between the centers of each pair of adjacent lenses is different.

8. The liquid crystal display device of claim 4, wherein the base further comprises a lower surface, the lower surface comprising a plurality of micro cavities.

9. The liquid crystal display device of claim 8, wherein the micro cavities are uniformly distributed.

10. The liquid crystal display device of claim 4, wherein pitches between adjacent wave crests are nonuniform.

11. A prism sheet, comprising:
    a base comprising an upper surface; and
    a plurality of lenses disposed on the upper surface;
    wherein in a cross-section of the prism sheet, the upper surface is a continuous curve having a plurality of wave crests in different sizes and a plurality of wave troughs in different sizes, and heights of at least two of the wave troughs are different from each other;
    wherein the upper surface is wavy along a first direction and extends out linearly in a second direction, the first direction being perpendicular to the second direction;
    wherein the plurality of lenses form a serrated surface along the first direction and extend out linearly in the second direction, and each of the plurality of lenses is a long straight column having a triangular cross-section being parallel to each other.

12. A liquid crystal display device, comprising:
    a display panel; and
    a backlight module opposite to the display panel, the backlight module comprising:
       a prism sheet comprising a base and a plurality of lenses, the base comprising an upper surface, and the plurality of lenses are positioned on the upper surface;
    wherein in a cross-section of the prism sheet, the upper surface is a continuous curve having a plurality of wave crests in different sizes and a plurality of wave troughs in different sizes, the upper surface is wavy along a first direction, and the lenses form a serrated surface along the first direction;
    wherein the base further comprises a lower surface, the lower surface comprising a plurality of uniformly distributed micro cavities;
    wherein the upper surface is wavy along a first direction and extends out linearly in a second direction, the first direction being perpendicular to the second direction;
    wherein the plurality of lenses form a serrated surface along the first direction and extend out linearly in the second direction, and each of the plurality of lenses is a long straight column having a triangular cross-section being parallel to each other.

13. A liquid crystal display device, comprising:
    a display panel; and
    a backlight module opposite to the display panel, the backlight module comprising:
       a prism sheet comprising a base and a plurality of lenses, the base comprising an upper surface, and the lenses positioned on the upper surface;
    wherein in a cross-section of the prism sheet, the upper surface is a continuous curve having a plurality of wave crests in different sizes and a plurality of wave troughs in different sizes, the upper surface is wavy along a first direction, and the lenses form a serrated surface along the first direction;

wherein heights as measured between tops of the wave crests and bottoms of the wave troughs are non-uniform;

wherein the upper surface is wavy along a first direction and extends out linearly in a second direction, the first direction being perpendicular to the second direction;

wherein the plurality of lenses form a serrated surface along the first direction and extend out linearly in the second direction, and each of the plurality of lenses is a long straight column having a triangular cross-section being parallel to each other.

\* \* \* \* \*